United States Patent Office 3,331,571
Patented July 18, 1967

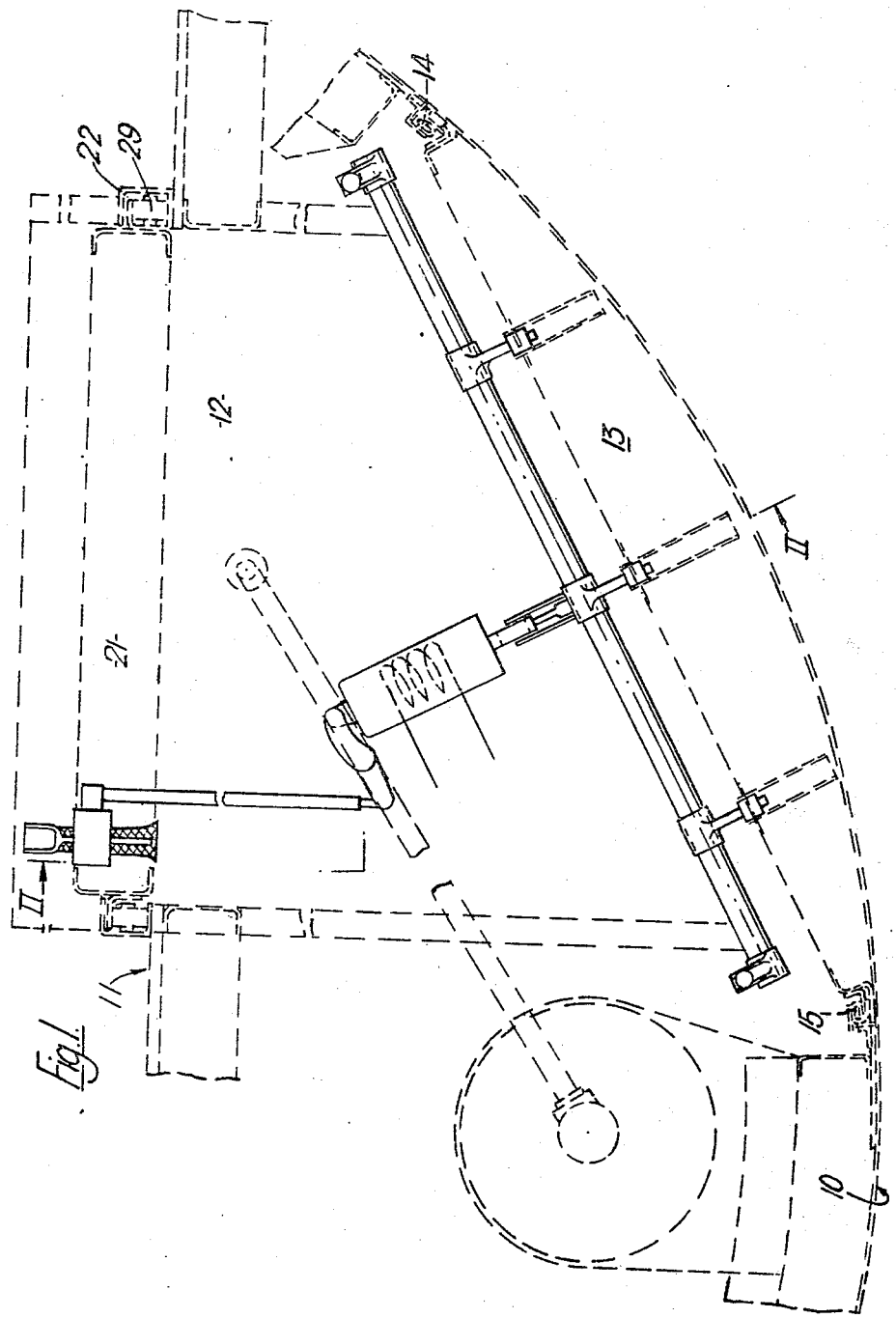

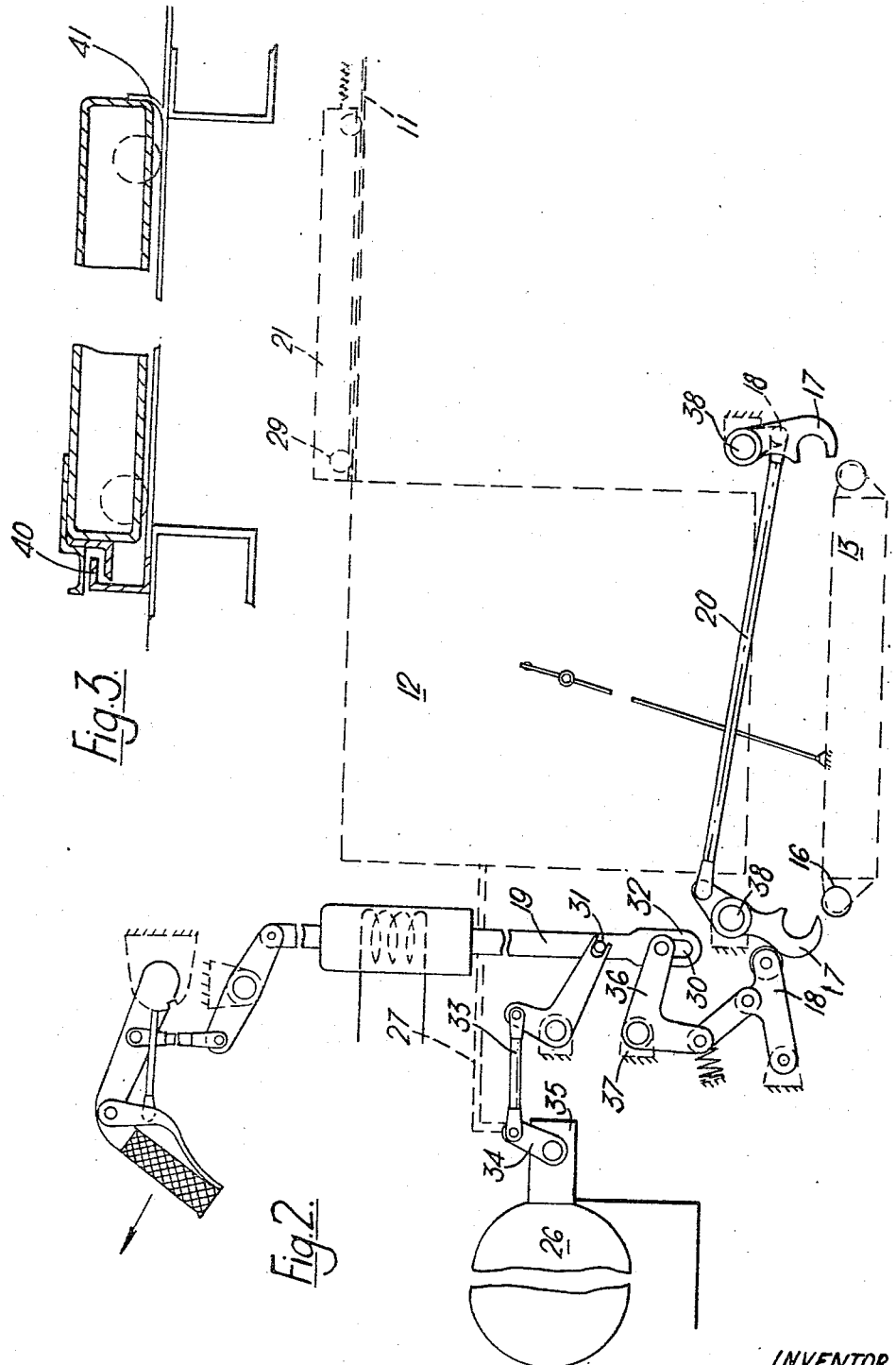

3,331,571
EMERGENCY EXIT ARRANGEMENTS
IN AIRCRAFT
Royston French Lawrence and Graham Llewellyn Ferrier, Bristol, England, assignors to British Aircraft Corporation (Operating) Limited, London, England, a British company
Filed Apr. 16, 1965, Ser. No. 448,774
Claims priority, application Great Britain, Apr. 22, 1964, 16,703/64
12 Claims. (Cl. 244—137)

In the list of safety requirements for flight test crew for supersonic transport aircraft protoypes it is stated that emergency exits must be openable in flight throughout the manoeuvre envelope of the aircraft. In addition it is desirable that the exits should be openable in the event of a complete failure of all normal auxiliary power supplies and also at any cabin pressure differential from full to zero. It is also desirable that the emergency door itself should be ejected in the event of the aircraft entering a stabilised stall condition.

According to the present invention, an emergency exit arrangement in an aircraft includes a passage extending from a cabin to an outer skin of the aircraft an ejectable door at the outer end of the passage a door at the inner end of the passage, means for raising the pressure within the passage to a greater value than that within the aircraft cabin, and automatic means for ensuring that the outer door is only released when the pressure within the chute has reached a predetermined value.

By raising the pressure within the passage, while the inner door is closed, and then releasing the outer door, the outer door is forcibly ejected; if the inner door is then opened, the crew may escape down the passage.

The accompanying drawing shows one example of an arrangement according to the invention. In these drawings:

FIGURE 1 is a transverse part section of an aircraft fuselage;
FIGURE 2 is a section on lines II—II in FIGURE 1;
FIGURE 3 is an enlargement of part of FIGURE 1.

In the drawings, the fuselage skin is indicated by reference numeral 10 whilst the cabin floor is indicated by 11. Extending between these is a rectangular-sectioned chute 12 constituting the passage and the lower end of which is pressure sealed against the interior surface of an outer emergency door 13. The door 13 fits closely with an aperture in the fuselage skin, its outer skin being flush with the fuselage contour. It is pressure sealed to the fuselage by a sealing strip 15. The door is retained in its locked position by a series of lugs 16, see FIGURE 2, situated around its periphery which engage in hook catches 17 rotatably mounted on the fuselage structure. These catches are held in the locked position and may be rotated to release the door.

The upper end of the chute 12 is sealed by a door 21 mounted upon a series of rollers 29 co-operating with tracks 22 on either side of the door aperture. In its closed position the door is restrained by a catch. On release of the catch, the door is urged towards an open position by a flat coil spring mounted on a bobbin, which when extended will tend to recoil itself upon the bobbin. As shown in FIGURE 3, three sides of the aperture for the door carry seals 40, and the fourth presents a seal 41. When the chute is pressurized, those seals all operate. Moreover if there is a pressure differential above and below the door, the resultant force will cause a frictional restraint to movement of the door along the tracks 22. Furthermore, a quick release pin attached to a nylon cord anchored to the outer door 13 prevents sliding movement of the door 21 until it is withdrawn. It projects through the floor forming the periphery of the door opening, and into the door itself.

When the external door 13 is ejected it removes the quick release pin. The internal door 21 is not, however, free to slide open until the differential between its upper and lower surfaces, i.e., the pressure within the aircraft cabin and within the escape chute, has been equalized. This will normally be achieved by using the aircraft cabin pressure relief valves but if this has not been done when the outer door 13 is released the cabin air will be allowed to exhaust at a pre-determined rate through a non-return valve (not shown) in the chute wall.

Pressurization of the chute is arranged by a compressed air storage bottle 26 connected via a release valve 35 and a duct 27 to the interior of the chute. The pressure exerted upon the outer door is governed by a design criterion that the door be capable of being ejected when being subjected to inward loads amounting to ⅔ of the maximum total aerodynamic and inertia forces capable of acting on it. Release of compressed air into the chute is manually controlled in conjunction with the emergency door release.

As shown in FIGURE 2, an actuation linkage 19 leading from the flight deck has a linkage 31, 33 and 34 connected to the valve 35 of the compressed air bottle 26. A lost-motion device 30 and 32 connects the linkage to a lever 36 pivoted to the fuselage structure at 37.

A series of the catches 17, pivotally mounted at 38, are arranged to engage a corresponding series of the lugs 16 on opposite edges of the door 13. At least one catch 17 on each side of the door has a surface which co-operates with a cam carrying member 18, operated by the lever 36. This ensures that the door is held in its locked position or on operation of the linkage 19 is forced outwards on rotation of the catches. A link 20 imparts any movement of the lever 36 to a lever controlling the similar series of catches and lugs on the far side of the door opening. There is a pressure relief valve to limit the maximum pressure in the chute.

In an emergency the following sequence of operation is adopted. Initial movement of the pilot's control opens the air bottle valve thereby pressurizing the interior of the chute by at least 5 p.s.i. above its previous pressure. Further movement of the control releases the emergency door 13 so that the pressure within the chute forces it outwards, thus breaking any ice formed around the door aperture; the door is thus forcibly jettisoned. After a delay, the upper door is released as the ejected door removes the quick release pin. As explained above however, the upper door does not open until the pressure on the two sides of it are nearly equal.

As soon as the pressure within the chute has fallen upon ejecting of the emergency door 13, the cabin air can escape through a non-return valve and out of the bottom of the chute until the pressure differential across the upper door 21 has fallen sufficiently to permit it to open.

Alternatively, the initial actuation may be effected by electrical means. For example a circuit may be provided, which may automatically energize a solenoid to operate the lever 19 in response to a danger signal. Such a circuit can readily be adapted to be closed, at any one of a number of points in the aircraft, to energize the solenoid, either alternatively or in addition to the automatic energization.

We claim:
1. An emergency exit arrangement in an aircraft, and including a passage extending from a cabin to an outer skin of the aircraft, an outer door covering the outer end of the passage, an inner door covering the inner end of the passage, catches which in a first position hold the outer door in place, and in a second position release the door entirely, means for raising the pressure within the passage to be above that within the cabin, and means operatively connected with said pressure raising means for retaining the catches in their first position until the means for raising the pressure has been operated.

2. An arrangement according to claim 1, in which the catches are hook shaped and engage, in the first position lugs on the door, and in the second position release the door for the raised pressure to eject it.

3. An arrangement according to claim 1, in which the passage extends between the cabin floor and the outer skin of the underside of the aircraft fuselage.

4. An arrangement according to claim 1, in which the inner door slides on rollers which engage in tracks on two opposite sides of the door, and means permanently urging the inner door towards its open position.

5. An arrangement according to claim 1 having means to prevent opening of the inner door until the pressure in the cabin is equal to that in the passage.

6. An arrangement according to claim 5, in which the opening-preventing means comprises flexible seals mounted between the inner door and the aperture, which impede movement of the door when subjected to pressure differential, and a non-return valve which permits air to pass from the cabin to the passage.

7. An arrangement according to claim 1, in which the means for raising the pressure of the passage comprises a bottle of compressed air, said arrangement including seals between the passage and the doors.

8. An arrangement according to claim 1, in which the retaining means for the catches is constituted by a lost motion mechanism.

9. An arrangement according to claim 8, having electrical and manual operating means for the lost motion mechanism.

10. An arrangement according to claim 1, having means to ensure that the inner door cannot be opened unless the outer door has been ejected.

11. An arrangement according to claim 10, in which the last means comprises a flexible member attached at one end to the outer door and having a pin on its other end, the pin passing through a member associated with the inner door and through a member associated with a cabin surface, and the flexible member being longer than the distance between the doors.

12. An emergency exit arrangement in an aircraft including a passage extending from a cabin to an outer skin of the aircraft, an ejectable door at the outer end of the passage, a door at the inner end of the passage, means for raising the pressure within the passage to a greater value than that within the aircraft cabin, latch means for normally holding said outer door closed, an operating member operatively connected to said pressure-raising means for actuating the same, means for moving said latch means to door-releasing position, and a lost motion connection between said operating member and said latch moving means to produce operation of the latch moving means only after the operation of said pressure-raising means.

References Cited
UNITED STATES PATENTS

| | | | |
|---|---|---|---|
| 1,814,642 | 7/1931 | Spear | 114—16.6 |
| 2,942,816 | 6/1960 | Dostie | 244—137 |
| 3,144,224 | 8/1964 | Carroll | 244—129 |

MILTON BUCHLER, *Primary Examiner.*

ALFRED E. CORRIGAN, *Examiner.*